Patented Mar. 28, 1944

2,345,357

UNITED STATES PATENT OFFICE 2,345,357

ROSIN-DRYING OIL-MODIFIED PHENOL-FORMALDEHYDE RESIN

Paul O. Powers, Lancaster, Pa., assignor to Armstrong Cork Company, Lancaster, Pa., a corporation of Pennsylvania No Drawing. Application December 20, 1940
Serial No. 370,964

8 Claims. (Cl. 260—19)

This invention relates to phenol-formaldehyde resins and modified phenol-formaldehyde resins having high viscosity.

It is an object of the invention to so control the initial raw materials and conditions of condensation of phenols and formaldehyde that modified resins of this type made according to this invention are so viscous (in other words, have such a degree of condensation) and have such reactivity with heat that the modified resins may be incorporated with the softer, slower-hardening drying oils, such as linseed and soya bean oil, instead of the harder and faster-hardening tung or China-wood oil, (such incorporation being performed with heat to produce a homogeneous and clear mixture without the formation of insoluble, incompatible resinous masses during the period of heating with the drying oil to incorporate the resin therein) to produce a modified resin-drying oil mixture of such viscosity and conditions of compatibility as to constitute a satisfactory vehicle for paints and varnishes, especially such as are employed in coating vertical surfaces where the properties of such paints and varnishes are especially important with respect to resistance to flow. The modified resins of the invention are of such character that paints and varnishes made from them are capable of rapid setting with heat.

Heretofore attempts to make viscous heat-reactive resins for paint and varnish vehicles have generally been concerned with the use of phenols having only two unsubstituted reactive positions in the molecule. The three reactive positions of phenol itself are the two ortho and the para positions relative to the hydroxyl group. The use of phenols having only two unsubstituted reactive positions in the molecule results in the production of resins which are generally characterized by good solubility in mineral and drying oils, a property which has been much sought after when the resins are to be employed in varnishes and paints containing drying oils. However, Hoenel in Patent 2,139,081 points out the fact that although all phenols having more than two unsubstituted reactive positions had been excluded entirely as a raw material in the making of such resins previously, he has been able to employ such phenols provided they are present in small quantities not over 10% of the phenols in the initial reaction mixture to obtain resins which are still characterized by solubility in oils and are, therefore, useful for making varnishes.

It has now been found that it is possible to obtain phenol-formaldehyde condensates characterized by proper reactivity with heat to adapt them for modification with rosin to produce resins having greater viscosity than those heretofore available but which are still compatible with drying oils in spite of their high degree of condensation.

The heat-reactive resins of this invention are made from a mixture of one or more para-substituted phenols with one or more other phenols having more than two unsubstituted reactive positions in the molecule, the latter phenol or phenols constituting from 25 to 60 mole per cent of the total phenolic content. The mixture of phenols is condensed with 1½ to 2 moles of formaldehyde per mole of the phenols, based on the average molecular weight of the phenol mixture. Any source of formaldehyde, such as formalin, paraform, hexamethylene-tetramine, etc., may be employed. Generally, the condensation is carried forth to a dialcohol stage wherein the condensate is still quite fluid and the product is then modified by rosin or a resinate of a metal of the second group of the periodic table of elements, and especially those of the alkaline earth group. When rosin itself is employed, as is preferred, it may subsequently be partially neutralized with a polyhydric alcohol, such as glycerol.

The para-substituted phenol comprising from 40 to 75 mole per cent of the phenolic mixture may contain alkyl, aryl, aralkyl, and alkylaryl groups, such as methyl, ethyl, propyl, isopropyl, tertiary-butyl, tertiary-amyl, tertiary-octyl, phenyl, benzyl, etc. The para-substituted phenols should all have at least two reactive positions unsubstituted; however, either or both of the meta positions with respect to the hydroxyl group may be substituted with groups other than hydroxyl groups. The other component of the phenolic mixture comprises one or more phenols having three or more reactive positions. Representative examples of this type of phenol are phenol itself, meta-cresol, 3,5-xylenol, and certain of the bis-phenols. The bis-phenols, such as the symmetrical 4,4'-diphenylol-propane having at least three unsubstituted reactive positions are equivalent to the simple phenols having three unsubstituted reactive positions. In fact, it is generally considered that the corresponding diphenylol-methane is one of the initial intermediate reaction products obtained from the condensation of formaldehyde with phenol. For this reason, these bis-phenols function as the equivalents of the phenols having at least three unsubstituted reactive positions rather than those, such as the para-phenols, which have only two unsubstituted reactive positions in the molecule. Commercially obtainable mixtures, such as meta-para-cresols, are usable in the process, provided they have the right proportion between the two types of ingredients, and further provided they do not contain any large quantity of ortho-cresol. The mixture of phenols should not contain more than about 5% of ortho-substituted phenols, since such phenols have been found to produce unsatisfactory soft products having a low degree of condensation. The higher the proportion of the more reactive phenols containing at least three unsubstituted reactive positions in the molecule, the higher the viscosity of the resulting rosin-modified condensation product. Also the greater the size of the para-substituent in the para-substituted phenol, the lower the viscosity of the rosin-modified condensation product with rosin. Thus, para-cresol will produce a much more viscous modified resin than any other para-substituted phenol. The use of a mixture composed entirely of phenols having at least three unsubstituted reactive positions in the molecule would produce modified resins which are insoluble in drying oils and incapable of being made compatible with them by the procedure outlined below. On the other hand, the use of a mixture of phenols composed entirely of para-substituted phenols having only two unsubstituted reactive positions would produce modified resins which are too soluble and not sufficiently viscous. The use of a mixture of these two types of phenols in the proportions cited above produces condensates which border so closely on heat-hardening resins that they would be converted to insoluble and infusible materials if further condensation were performed without the dispersing influence of rosin, but which are capable of being modified with rosin in the manner described hereinbelow to a form which is of increased viscosity but still compatible with drying oils.

The mixture of phenols is subjected to the action of formaldehyde in the proportion of 1½ to 2 moles of formaldehyde for each mole of phenol based on the average molecular weight of the mixed phenols, except in the case where certain phenols are contained in the mixture which comprise more than one phenolic nucleus in the compound. In the latter case, the formaldehyde should be present in the proportion of 1½ to 2 moles for each phenolic nucleus so that in the case of a bis-phenol, from 3 to 4 moles of formaldehyde would be used for each mole of bis-phenol. The condensation with formaldehyde is preferably carried out under conditions ranging from about four hours at 60° C. to about two to three at 90° C. but higher or lower temperatures may be employed with shorter or longer times respectively. The time and temperature of reaction are so selected that substantially all of the formaldehyde that can combine with the phenols is so combined to form the mono-, di-, or tri-alcohol phenols, without carrying the condensation of such derivative phenols further. This stage of condensation is hereinafter referred to as the "dialcohol" stage even though there may also be present in the condensation product certain amounts of mono-alcohol phenols, tri-alcohol phenols, and low molecular weight condensation products of the several derivative alcohol-phenols that are formed during the time required for the last free portions of the formaldehyde to combine with the phenols. The time or temperature of reaction or both are increased as the size of the substituent group in the para-substituted phenol increases. In all cases, the reaction is carried out under alkaline conditions, preferably at a pH of 9 or higher. Any suitable alkali may be used, but it is preferred to use a nonvolatile alkali, such as sodium hydroxide. In case of using phenols having large alkyl or other substituent groups, there is used enough alkali to dissolve the phenol at the temperature of reaction.

The resulting heat-reactive phenol-formaldehyde resin is then modified by reacting it with wood or gum rosin or resinates of metals selected from the second group of the periodic table of elements, and especially those of the alkaline earth metals, such as calcium. The resinates employed are preferably those that are commercially available, such as calcium resinate in which the rosin acid is only about 50% neutralized. This step is performed by first fusing the rosin at a temperature of 100° C. to 120° C. and adding thereto from 20 to 100 parts by weight of phenolic condensation product (based upon the dry weight of phenolic aldehyde condensation product) for each 100 parts by weight of rosin and then gradually heating the mixture up to 225° C. to 250° C. over a period of about half an hour. While the use of 20 to 100 parts by weight of phenolic resin for each 100 parts of rosin is highly satisfactory, the preferred range is from 25 to 40 parts by weight of phenolic resin (based on the dry weight as before). During the heating of the rosin and phenolic resin, water and formaldehyde are removed up to about 150° C. and further condensation occurs throughout the heating period. The proportions of the two types of phenols in the original reactive mixture and the time and temperature of heating with formaldehyde are so controlled that the modified resins resulting from the above-mentioned heating with rosin have viscosities in the range of about 100 to 100,000 poises (determined on a solution of 60% by weight of modified resin in toluene at 25° C.). Commercially available resins heretofore used in making paints and varnishes have correspondingly determined viscosities which range from about 3 to 25 poises. The new modified resins also show a cloud above room temperature up to about 250° C. when mixed with an equal part by weight of Nujol, a white paraffinic mineral oil having an aniline point of about 103° C. to 105° C. It has been found that rosin and the resinate referred to are unique as compared with other related resins in their capability of combining with the phenolic resin to produce a highly viscous resin capable of being mixed with drying oils to form compatible paint and varnish vehicles.

The modified resins produced as described may be used for various purposes, such as making mastic tile, thermoplastic shoe stiffeners such as box toes and counters, adhesives, lacquers, paints, and varnishes, particularly those employing drying oils as a major component of the vehicle. For example, in making a thermoplastic shoe stiffener, a woven or felted fabric is impregnated with the composition comprising from 60 to 75 parts of the rosin or resinate modified phenolic-formaldehyde resin and from 25 to 40 parts of plasticizers, which may include any one or more of the following: Bexin (a soft residue formed during the production of wood rosin), mineral oils, semi-drying oils, nondrying oils, etc. The fabric may be cut to shape before or after impregnation. The impregnated material of the proper size and shape can then be softened by heating at the time the shoe stiffener is to be incorporated in the shoe.

In making a plastic tile, a composition comprising from 15% to 26% by weight of the modified phenol-formaldehyde resin, from about 6% to 25% of a plasticizer, such as mineral oil, stearine pitch, bodied oils, oil gels, oxidized oil gels, and from about 65% to 75% of inert fillers, such as asbestos, clay, talc, serpentine, or mixtures of any two or more of the plasticizers or fillers may be used. In making such a composition, the mixture of the modified resin and the plasticizing mineral oils should be adjusted so that a cloud between about 30° C. to 100° C. is obtained. The cloud point is determined by heating the mixture of resin and oil to convert it to a clear homogeneous phase and then gradually cooling the composition until the first appearance of cloudiness occurs. The temperature at which this cloudiness or separation of phases appears is taken as the cloud point. A similar tile may be made from such phenol-formaldehyde resins as have been modified by rosin by first converting the modified resin into a glyceride in a manner more particularly described below, but in such a case the viscosity of the glyceride form of the rosin-modified phenol-formaldehyde resin should be controlled to fall within the range of about 25 to 1,000 poises.

The rosin or resinate modified resins produced above are especially useful in making print paints and varnishes, especially those to be used in printing floor or other surface coverings requiring a film of paint of appreciable thickness to serve as a wear surface. The modified resins of this application can also be employed in paints to give the metastable condition so much sought after and particularly disclosed in the patent to Pennell, 2,179,562, when the painted or varnished surface is to be held in a vertical position for drying. For this purpose, the cloud point of the modified resins serves as an indication of the condition of metastability of the varnishes and paints made from the resins. In making paints from the resins of this application, the resins are reacted with an equal or greater amount of a drying oil at a temperature ranging from 250° C. to 270° C. for a period of fifteen minutes to several hours depending upon the viscosity of the initial modified resin and upon the proportion between that resin and the drying oil in the mixture being heated. In this step, any of the following drying oils are useful: linseed oil, soya bean oil, tung oil, dehydrated castor oil, and oiticica oil. Because of the difficulty of dissolving the modified resins in heat-bodied drying oils which are generally employed in making varnishes and paints, it is necessary to dissolve the modified resin by heating it with the raw oil, effecting a combined action of heat bodying the oil and causing ester interchange between the resin and the oil. If desired, the resins may be neutralized with glycerine, or any polyhydric alcohol, such as diethylene glycol, sorbitol, mannitol, pentaerythritol, etc. The neutralization with glycerine or other polyhydric alcohol is performed by heating the rosin modified resin at 275° C. to 280° C. for a period ranging from three to five hours. In the case of those modified resins having viscosities in the portion of the permissible range defined above, it is necessary to disperse the modified resin in the drying oil before neutralization to prevent the formation of insoluble and infusible masses. Of course, this neutralization is performed only with rosin modified resins and would not be employed with such resins as have been modified by means of the resinates of the metals cited above.

The combined drying oil and modified resin, whether unneutralized, neutralized with a polyhydric alcohol, or formed with a resinate in the beginning, is so constituted that it shows a cloud between 30° C. and 100° C. when mixed with 50% of its weight of a highly paraffinic mineral oil having an aniline point of about 136° C. The cloud point is an indication of the solubility or compatibility of the rosin-modified resin in the drying oil. This characteristic cloud can be produced in all cases from the modified resins herein disclosed by suitable proportioning and heating with drying oils thereby effecting an ester interchange, the extent of which controls the compatibility of the combined rosin-modified resin and drying oil, and such resin-drying oil mixtures as have this characteristic cloud are highly satisfactory as vehicles for producing paints generally, and especially those having the metastable condition of the patent cited.

Examples illustrative of the invention (in which the proportions given are by weight unless otherwise specified) are as follows:

A. MAKING OF PHENOL-FORMALDEHYDE RESIN

*Example 1*

Seventy-five parts of phenol and 180 parts of para-tertiary-butyl phenol are added to 330 parts of 37% formalin. Five parts of sodium hydroxide in 10 parts of water are added and the mixture is heated gradually to 75° C. The mixture is stirred for six hours at this temperature and then cooled to ordinary temperature whereupon a small amount of hydrochloric acid is added to neutralize the caustic soda. The resin is then allowed to separate and the water layer drawn off.

*Example 2*

Ninety-seven parts of a commercial meta-para-cresol mixture (containing 40% para-cresol, 60% meta-cresol, and not more than about 5% ortho-cresol) and 15 parts of para-tertiary-butyl phenol are mixed with 150 parts of 37% formalin. Two parts of sodium hydroxide in 4 parts of water are added and the mixture is heated to 60° C. and is agitated at this temperature for six hours. Thereafter the mixture is cooled to room temperature, neutralized, and the resin is separated from the water.

*Example 3*

A mixture containing 50 mole per cent of phenol and 50 mole per cent of para-butyl phenol with 2 moles of formaldehyde in aqueous solution for each mole of phenol (based on the average molecular weight) is heated for four hours at 70° C. at a pH of 9 with stirring. Thereupon the mixture is cooled, neutralized, and the resin separated from the water.

*Example 4*

A mixture containing 50 mole per cent of meta-cresol and 50 mole per cent of para-cresol with enough formalin so that there are 2 moles of formaldehyde for each mole of cresol and 4% by weight of a 20% solution of sodium hydroxide is reacted for six hours at 60° C. The product is cooled, neutralized, and the resin is separated from the water.

B. Viscous Modified Resins

Example 5

Five hundred parts of rosin are melted in a heated kettle and the temperature is raised to 110° C. Into this fused rosin, the phenolic resin obtained in Example 1 is added gradually and the temperature is slowly raised with stirring and with care to avoid excessive foaming until a temperature of about 250° C. is reached. The period of heating involves a period of thirty minutes. During the heating, water and formaldehyde are evaporated and may be recovered, and further condensation of the resin occurs together with a combination with the rosin to produce a highly viscous resinous product.

Example 6

The resin formed in Example 2 is added to 250 parts of rosin at 120° C., and the temperature of the mixture is then gradually raised to 250° C. as in Example 5.

Example 7

Thirty-five parts of the condensation product obtained in Example 3 are reacted with 65 parts of rosin in the manner recited in Examples 5 and 6.

Example 8

One hundred and ten parts of the resin of Example 4 (on the dry basis) are added to 250 parts of rosin in the fused condition at 110° C., and the reaction is completed as in Examples 5, 6, and 7.

Thirty-five parts of the condensation product of Example 1 are reacted with 65 parts of limed rosin prepared by reacting 100 parts of wood rosin with 5 parts of hydrated lime.

C. Incorporation of Viscous Modified Resins in Drying Oils

Example 10

To the resin formed in Example 5, 750 parts of raw linseed oil are added and the mixture is heated with stirring to a temperature of 260° C. over a period of about one half an hour.

Example 11

To the modified resin produced in Example 6, 400 parts of soya bean oil are added gradually and then 35 grams of glycerine are added. The temperature is gradually raised to 275° C. to 280° C. and the mixture is heated with stirring at this temperature for five hours.

Example 12

The resin obtained in Example 7 is dispersed in 200 parts of linseed oil, and the mixture is heated at 270° C. for a period of half an hour.

Example 13

To the resin obtained in Example 8, 360 parts of an alkali-refined linseed oil are added, and the mixture is heated to 270° C. for a period of one half hour.

D. Esterification of Drying Oil-Resin Dispersions (See Example 11)

Example 14

To the resin produced in Example 5, 750 parts of raw linseed oil are added, and the mixture is heated with stirring to 260° C., whereupon 70 parts of pure glycerine are added. The temperature is then slowly raised to about 270° C. to 280° C. and held there with stirring for a period of four hours. The time of reaction was determined by testing samples until an acid number of less than 15 is obtained.

Example 15

To the resin obtained in Example 12, 10 parts of glycerine are added and the mixture is heated at 275° C. for a period of four hours until an acid number of less than 15 is obtained.

Example 16

To the resin obtained in Example 13, 25 parts of glycerol are added and the mixture is raised to a temperature of 275° C. where it is heated for about four hours until the acid number is below about 10.

Example 17

The resin obtained in Example 9 is dispersed in 200 parts of dehydrated castor oil and the mixture is heated at 270° C. for a period of half an hour.

Example 18

The drying oil-resin dispersion of Example 14 may be further processed by the addition of more raw oil or by the addition of bodied oils to reduce the resin content to about 15% or 30% by weight of the resin dispersion to serve as a base for print paint vehicles.

Example 19

To the neutralized modified resin-linseed oil dispersion produced in Example 15, 100 parts of a heat-bodied linseed oil (4 poise-Q-bodied) are added, and a grinding paste is made by incorporating in 25 parts of the resulting resin-linseed oil dispersion-bodied oil mixture, 30 parts of lithopone, 25 parts of zinc oxide, and 37 parts of whiting. To 100 parts of this grinding paste, 37 parts of the mixture of bodied linseed oil and neutralized modified resin-drying oil dispersion and 5 to 10 parts of a thinner, such as mineral spirits, are added.

Example 20

The product obtained in Example 16 may be used with or without the addition of bodied linseed oil as a varnish.

While the invention has been disclosed in terms of specific examples employing certain materials in definitely stated proportions, the description is intended to be merely illustrative. It is obvious that various modifications may be made without departing from the spirit of the invention and it is to be understood that this invention is limited only by the appended claims.

I claim:

1. A viscous product obtained from the condensation of formaldehyde with a mixture of about 40% to 75% of a para-substituted phenol having two unsubstituted reactive positions and about 25% to 60% of a phenol having at least three unsubstituted reactive positions, the formaldehyde in the initial reaction mixture being present in the proportion of about 1½ to 2 moles per mole of phenols and the condensation being carried out under alkaline conditions for a time and at a temperature to effect combination with the phenols of substantially all the formaldehyde that enters into the condensation to produce a fluid product of the dialcohol type, the subsequent heating of 20 to 100 parts by weight of said phenol-formaldehyde resin with 100 parts by weight of rosin gradually to a temperature of the order of about 225° C. to 250° C., the subsequent heating of said rosin-modified phenol-formaldehyde resin with at least an equal weight of drying oil at a temperature of the order of 260° C., and the subsequent at least partial neutralization of said last-mentioned product by reacting it with a polyhydric alcohol at a temperature of the order of 275° C. to 280° C.

2. A viscous product obtained from the condensation of formaldehyde with a mixture of about 40% to 75% of para-tertiary-butyl phenol and about 25% to 60% of phenol, the formaldehyde in the initial reaction mixture being present in the proportion of about 1½ to 2 moles per mole of phenols and the condensation being carried out under alkaline conditions for a time and at a temperature to effect combination with the phenols of substantially all the formaldehyde that enters into the condensation to produce a fluid product in the dialcohol stage, the subsequent heating of 20 to 100 parts by weight of said phenol-formaldehyde resin with 100 parts by weight of rosin gradually to a temperature of the order of about 225° C. to 250° C., the subsequent heating of said rosin-modified phenol-formaldehyde resin with at least an equal weight of drying oil at a temperature of the order of 260° C. and the subsequent at least partial neutralization of said last-mentioned product by reacting it with a polyhydric alcohol at a temperature of the order of 275° C. to 280° C.

3. A viscous product obtained from the condensation of formaldehyde with a mixture of about 40% to 75% of para-cresol and about 25% to 60% of meta-cresol, the formaldehyde in the initial reaction mixture being present in the proportion of about 1½ to 2 moles per mole of phenols and the condensation being carried out under alkaline conditions for a time and at a temperature to effect combination with the phenols of substantially all the formaldehyde that enters into the condensation to produce a fluid product in the dialcohol stage, the subsequent heating of 20 to 100 parts by weight of said cresol-formaldehyde resin with 100 parts by weight of rosin gradually to a temperature of the order of about 225° C. to 250° C., the subsequent heating of said rosin-modified cresol-formaldehyde resin with at least an equal weight of drying oil at a temperature of the order of 260° C., and the subsequent at least partial neutralization of said last-mentioned product by reacting it with a polyhydric alcohol at a temperature of the order of 275° C. to 280° C.

4. A viscous product obtained from the condensation of formaldehyde with a mixture of about 40% to 75% of a para-substituted phenol having two unsubstituted reactive positions and about 25% to 60% of a phenol having at least three unsubstituted reactive positions, the formaldehyde in the initial reaction mixture being present in the proportion of about 1½ to 2 moles per mole of phenols and the condensation being carried out under alkaline conditions for a time and at a temperature to effect combination with the phenols of substantially all the formaldehyde that enters into the condensation to produce a fluid product in the dialcohol stage, the subsequent heating of 20 to 100 parts by weight of said phenol-formaldehyde resin with 100 parts by weight of rosin gradually to a temperature of the order of about 225° C. to 250° C., the subsequent heating of said rosin-modified phenol-formaldehyde resin with at least an equal weight of drying oil at a temperature of the order of 260° C., and the subsequent at least partial neutralization of said last-mentioned product by reacting it with glycerine at a temperature of the order of 275° C. to 280° C.

5. A viscous product obtained from the condensation of formaldehyde with a mixture of about 40% to 75% of para-tertiary-butyl phenol and about 25% to 60% of phenol, the formaldehyde in the initial reaction mixture being present in the proportion of about 1½ to 2 moles per mole of phenols and the condensation being carried out under alkaline conditions for a time and at a temperature to effect combination with the phenols of substantially all the formaldehyde that enters into the condensation to produce a fluid product in the dialcohol stage, the subsequent heating of 20 to 100 parts by weight of said phenol-formaldehyde resin with 100 parts by weight of rosin gradually to a temperature of the order of about 225° C. to 250° C., the subsequent heating of said rosin-modified phenol-formaldehyde resin with at least an equal weight of drying oil at a temperature of the order of 260° C., and the subsequent at least partial neutralization of said last-mentioned product by reacting it with glycerine at a temperature of the order of 275° C. to 280° C.

6. A viscous product obtained from the condensation of formaldehyde with a commercial mixture of para-cresol and meta-cresol in roughly the proportion of 50 mol per cent each and not containing over 5% ortho-cresol—in lieu thereof, the formaldehyde in the initial reaction mixture being present in the proportion of about 1½ to 2 moles per mole of phenols and the condensation being carried out under alkaline conditions for a time and at a temperature to effect combination with the phenols of substantially all the formaldehyde that enters into the condensation to produce a fluid product in the dialcohol stage, the subsequent heating of 20 to 100 parts by weight of said phenol-formaldehyde resin with 100 parts by weight of rosin gradually to a temperature of the order of about 225° C. to 250° C., the subsequent heating of said rosin-modified phenol-formaldehyde resin with at least an equal weight of drying oil at a temperature of the order of 260° C., and the subsequent at least partial neutralization of said last-mentioned product by reacting it with glycerine at a temperature of the order of 275° C. to 280° C.

7. A viscous product obtained from the condensation of formaldehyde with a mixture of about 40% to 75% of para-cresol and about 25% to 60% of meta-cresol, the formaldehyde in the initial reaction mixture being present in the proportion of about 1½ to 2 moles per mole of phenols and the condensation being carried out under alkaline conditions for a time and at a temperature to effect combination with the phenols of substantially all the formaldehyde that enters into the condensation to produce a fluid product in the dialcohol stage, the subsequent heating of 20 to 100 parts by weight of said phenol-formaldehyde resin with 100 parts by weight of rosin gradually to a temperature of the order of about 225° C. to 250° C., the subsequent heating of said rosin-modified phenol-formaldehyde resin with at least an equal weight of drying oil at a temperature of the order of 260° C., and the subsequent at least partial neutralization of said last-mentioned product by reacting it with glycerine at a temperature of the order of 275° C. to 280° C.

8. A viscous product obtained from the condensation of formaldehyde with a mixture of about 40% to 75% of a para-substituted phenol having two unsubstituted reactive positions and about 25% to 60% of a phenol having at least three unsubstituted reactive positions, the formaldehyde in the initial reaction mixture being present in the proportion of about 1½ to 2 moles per mole of phenols and the condensation being carried out under alkaline conditions for a time and at a temperature to effect combination with the phenols of substantially all the formaldehyde that enters into the condensation to produce a fluid product of the dialcohol type, the subsequent heating of 20 to 100 parts by weight of said phenol-formaldehyde resin with 100 parts by weight of rosin gradually to a temperature of the order of about 225° C. to 250° C., the subsequent heating of said rosin-modified phenol-formaldehyde resin with at least an equal weight of drying oil at a temperature of the order of 250° C. to about 270° C., and the subsequent at least partial neutralization of said last-mentioned product by reacting it with a polyhydric alcohol.

PAUL O. POWERS.

CERTIFICATE OF CORRECTION.

Patent No. 2,345,357.    March 28, 1944.

PAUL O. POWERS.

It is hereby certified that error appears in the printed specification of the above numbered patent requiring correction as follows: Page 5, second column, lines 28 and 29, strike out the words "in lieu thereof"; and that the said Letters Patent should be read with this correction therein that the same may conform to the record of the case in the Patent Office.

Signed and sealed this 30th day of May, A. D. 1944.

Leslie Frazer (Seal)    Acting Commissioner of Patents.